May 5, 1953 E. CONGDON 2,637,129

TAPE OR WEB READING DEVICE

Filed March 25, 1949 3 Sheets-Sheet 1

Inventor:
Ernest Congdon
by his Attorneys
Howson & Howson

Inventor:
Ernest Congdon
by his Attorneys
Howson & Howson

May 5, 1953 E. CONGDON 2,637,129

TAPE OR WEB READING DEVICE

Filed March 25, 1949 3 Sheets-Sheet 3

Inventor:
Ernest Congdon
by his Attorneys
Howson & Howson

Patented May 5, 1953

2,637,129

UNITED STATES PATENT OFFICE 2,637,129

TAPE OR WEB READING DEVICE

Ernest Congdon, Upper Darby, Pa.

Application March 25, 1949, Serial No. 83,450

6 Claims. (Cl. 40—31)

This invention relates to a novel device for enabling easy and rapid visual observation of a marked tape or web. While the invention is capable of general application, it is intended particularly for use in offices where it is necessary at times to read printed matter on a per tape. For example, the invention is useful in banks which keep a record of checks by printing on paper tapes.

The principal object of the invention is to provide a device which is easily operable and by means of which a person can rapidly read the markings on a tape or web.

Another object of the invention is to provide a device of this character which can be operated at any desired speed and which can be stopped instantly whenever desired.

A further object of the invention is to provide a device which is simple in construction and which can be manufactured and sold at low cost.

Other objects and features of the invention will be apparent from the following detailed description with reference to the accompanying drawings wherein Fig. 1 is a front elevational view of a device constructed according to the invention;

Figures 1, 6:
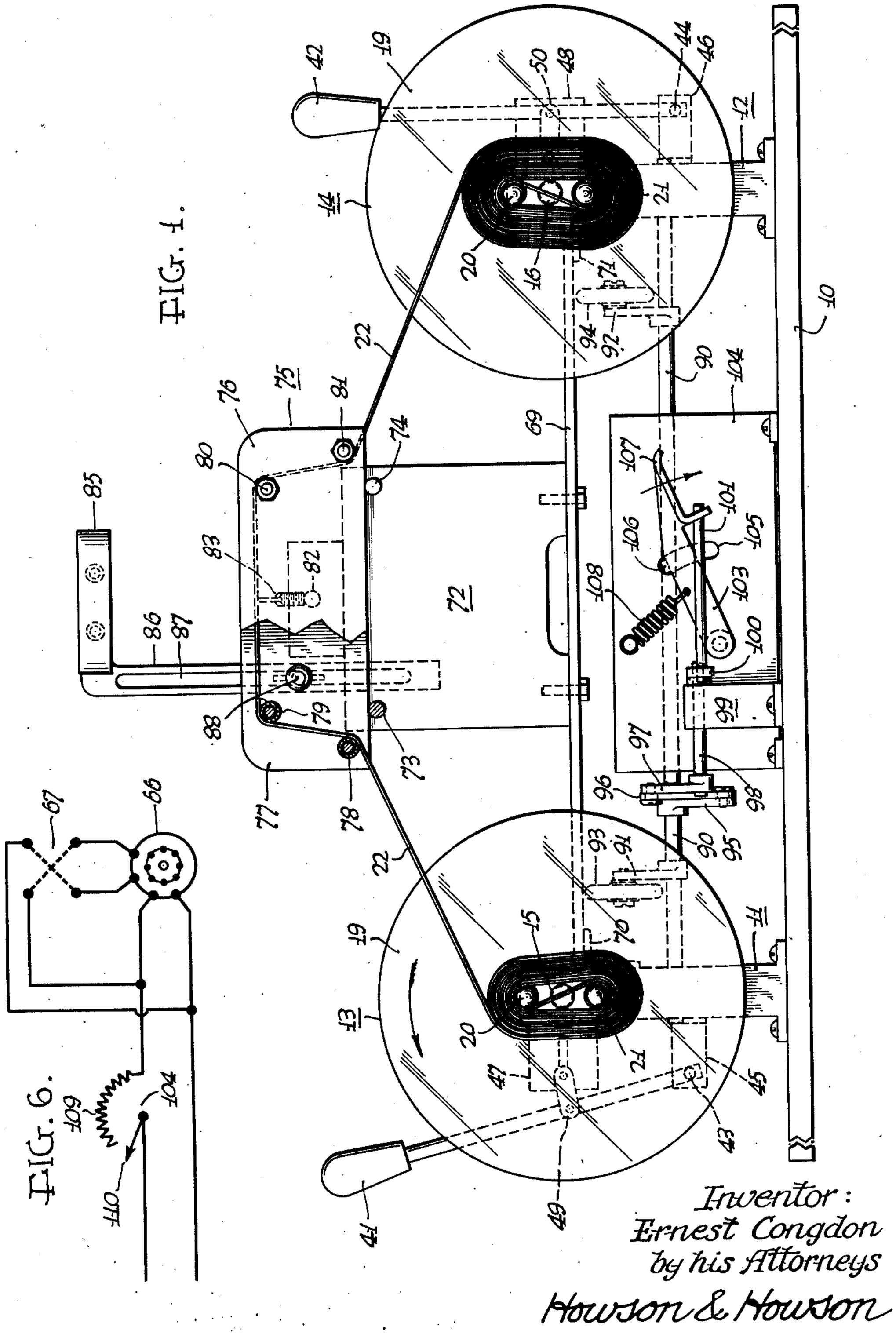
Fig. 6 is a diagrammatic illustration of the electrical circuit of the device.
Figures 2, 3:
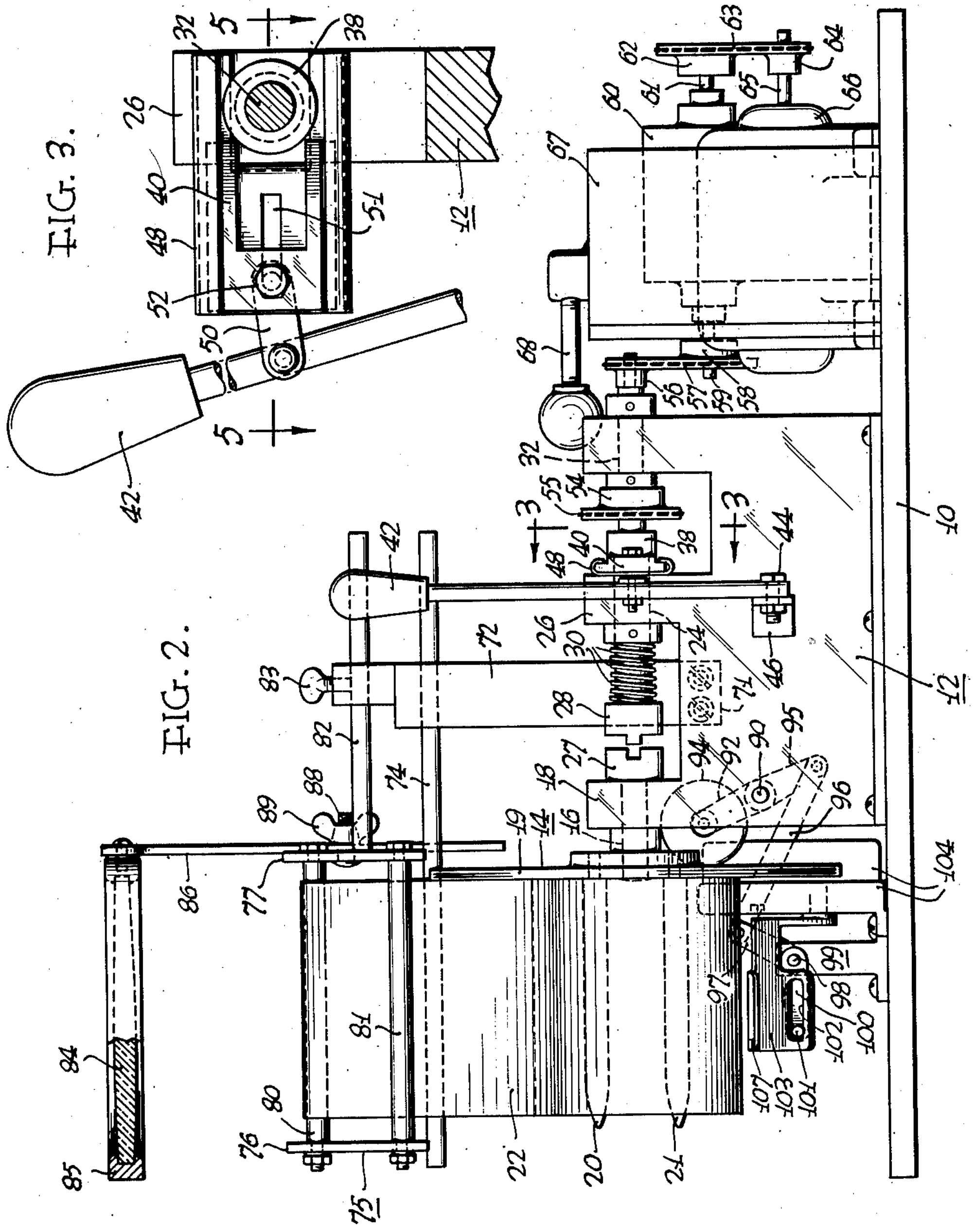
Fig. 2 is a side elevational view of the device.
Fig. 3 is a relatively large scale fragmentary sectional view taken along line 3—3 of Fig. 2.
Figure 4:
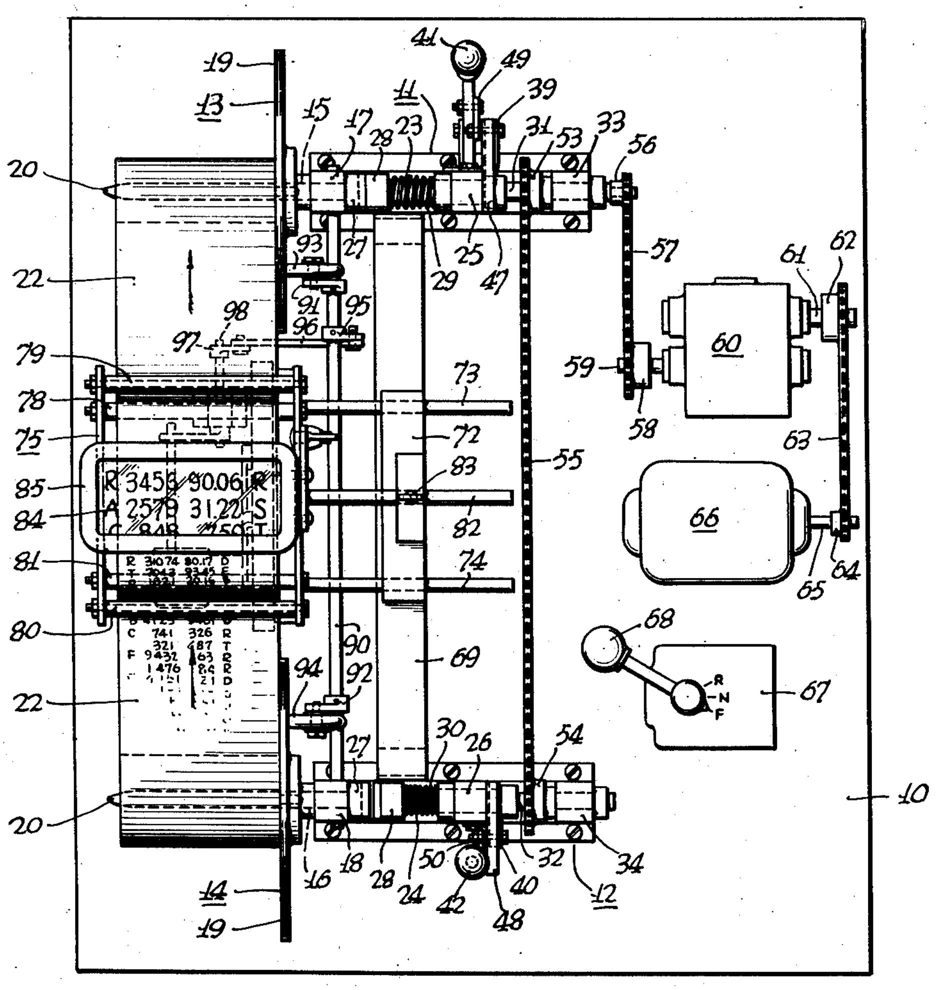
Fig. 4 is a plan view of the device.

Referring particularly to Figs. 1, 2 and 4, there is provided a flat supporting base 10 on which all of the parts of the device are mounted. A pair of spaced vertical supporting standards 11 and 12 are secured to the base in any suitable manner, as by means of screws, and these standards serve to support a pair of rotatable reels designated generally by reference characters 13 and 14. As may be seen in Fig. 4, the two reels are mounted on the ends of shafts 15 and 16, respectively, which are rotatably supported in bearings 17 and 18 at the upper part of each of the two supporting standards 11 and 12.

Each of the reels 13 and 14 comprises a disk 19 mounted on the end of the associated shaft, and a pair of pins or rods 20 and 21 secured to the disk and projecting laterally therefrom. The purpose of the disk will be apparent later. The two pins or rods constitute the reel proper and serve to support the tape or web 22 in wound condition, as may be seen in Fig. 1.

Figure 5:
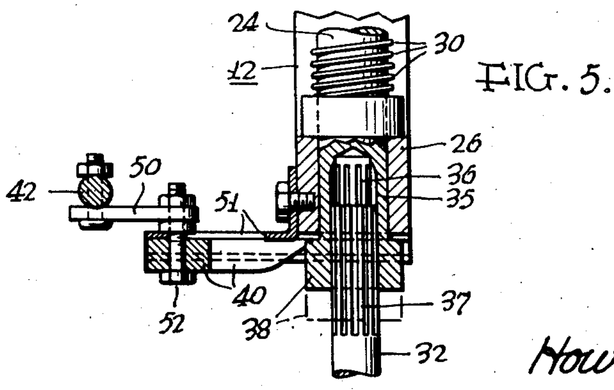
Fig. 5 is a fragmentary sectional view along line 5—5 of Fig. 3.

The two reels 13 and 14 are adapted to be selectively driven from a common power source by means of the mechanism now to be described. Associated with the reel shafts 15 and 16 are shafts 23 and 24 which are rotatably and slidably carried in bearings 25 and 26 at the top of the supporting standards 11 and 12. Each of the reel shafts 15 and 16 has a clutch portion 27 (see Fig. 2), and each of the associated shafts 23 and 24 has a complemental clutch portion 28. Springs 29 and 30 are arranged to urge the slidable shafts 23 and 24 toward the clutch engaging position. Associated with the shafts 23 and 24 are driving shafts 31 and 32 which are rotatably supported in bearings 33 and 34 at the top of the supporting standards 11 and 12. As may be seen in Fig. 5, each of the shafts 23 and 24 has a recess 35 in the end portion thereof, and the associated end of shaft 31 or 32 extends into the recess. As also shown in Fig. 5, the associated portions of the interfitting shafts are splined as at 36 and 37, so that the shafts are always in driving relation.

Each of the shafts 23 and 24 has a head portion 38, and associated with said shafts are slidable cam members 39 and 40. These members are manually and selectively controllable by means of levers 41 and 42 whose lower ends are pivotally connected at 43 and 44 to brackets 45 and 46 carried by the supporting standards 11 and 12. As may be seen in Figs. 2, 3 and 5, cam members 39 and 40 are slidably carried by brackets 47 and 48, and the cam members are connected respectively to the manual levers 41 and 42 through connecting links 49 and 50. As may be seen in Figs. 5 and 3, each of the brackets 47 and 48 is slotted, as shown at 51, to accommodate a bolt 52 adapted to move back and forth in the slot and serving to connect the cam member to the associated link.

When either of the manual levers 41 and 42 is outwardly disposed, the associated cam member is ineffective and the shaft 23 or 24 is engaged with the associated reel shaft 15 or 16. However, when either of the manual levers 41 and 42 is inwardly disposed, the associated cam member is effective to disengage the shaft 23 or 24 from the reel shaft 15 or 16.

As may be seen in Fig. 4, shafts 31 and 32 are provided with sprockets 53 and 54 which are interconnected by a chain 55. The shaft 31 is also provided with a sprocket 56 which is connected by a chain 57 to a sprocket 58 on the driven shaft 59 of a gear reduction unit 60. The driving shaft 61 of said unit is provided with a sprocket 62 which is connected by a chain 63 to a sprocket 64 on the shaft 65 of a reversible driving motor 66. The motor 66 is controllable through a reversing switch 67 having a manually adjustable handle or lever 68. This switch has three positions—neutral, forward and reverse, indicated in Fig. 4 by the letters N, F and R.

As shown in Figs. 1, 2 and 4, a horizontal supporting member 69 extends between the vertical standards 11 and 12 and is supported thereby on brackets 70 and 71. Centrally mounted on the supporting member 69 is a vertical support 72 from which extend a pair of rods 73 and 74. A tape guiding frame 75 is slidably supported by the rods 73 and 74. This frame comprises a pair of spaced plates 76 and 77, and four rollers 78, 79, 80 and 81 extending between the plates and supported thereby. As may be seen in Fig. 1, the tape or web 22 is arranged to extend beneath the rollers 78 and 81 and above the rollers 79 and 80. As shown in Fig. 2, a rod 82 extends from the plate 77 through an aperture in the upper part of support 72, and a thumb screw 83 is adapted to engage rod 82 so as to hold the tape guiding frame 75 in any adjusted position. A magnifying glass 84, carried by a frame 85, is supported above the horizontal run of the tape 22 by means of a vertical supporting member 86 which is adjustably carried by plate 77. The supporting member 86 has a slot 87 therein to accommodate a screw 88 carried by plate 77. A wing nut 89 serves to hold the member 86 in any adjusted position.

A shaft 90 extends between the vertical standards 11 and 12 and is rotatably supported thereby. This shaft carries arms 91 and 92 on which are mounted friction wheels 93 and 94 which are adapted to engage the disks 19 of the tape supporting reels. Also carried by shaft 90 is an arm 95 which is connected by link 96 to an arm 97 mounted on a shaft 98 which is rotatably carried by a support 99. The shaft 98 has a lateral extension 100 which serves as a crank and from which a rod 101 extends. The rod 101 extends into a slot 102 of a rotatable arm 103 which serves to actuate a control device 104 to be described later. The casing of device 104 has a slot 105 therein, and the arm 103 has an extending stop 106 thereon which co-operates with the slot 105 to limit the rotary movement of arm 103. The arm 103 has a hand-engageable portion 107 by means of which the operator may conveniently actuate the arm. A tension spring 108 serves to urge the arm 103 to a normal position at one end of its operating range, and when the arm is in that position, the friction wheels 93 and 94 are in engagement with the disks 19.

Referring now to Fig. 6, there are shown the motor 66 and the reversing switch 67. The control device 104 may take the form of a conventional on-off rheostat comprising a resistor 109 and a rotatable contact 110. When the arm 103 is in its normal position, the contact arm 110 is disengaged from the resistor 109, and consequently the motor 66 is de-energized. At the same time the friction wheels 93 and 94 are engaged with the disks 19. When the arm 103 is moved from its normal position, the contact arm 110 engages resistor 109, and at the same time the friction wheels are moved out of engagement with the disks 19. Initial engagement of contact arm 110 with resistor 109 causes operation of motor 66 at low speed, and as the arm 103 is moved further the speed of motor 66 is progressively increased. This is due to the fact that movement of contact arm 110 decreases the resistance in series with the motor 66.

From the foregoing description it will be seen that the tape or web 22 can be run through the device in either direction and at any desired speed. Adjustment of switch 67 determines the direction of movement of the chain 57, and selective positioning of levers 41 and 42 determines which reel will be driven in any instance. However, the motor 66 will not operate until the arm 103 is actuated away from its normal position. Actuation of said arm releases the brake mechanism comprising the friction wheels 93 and 94 and at the same time initiates operation of the motor 66. By variously positioning the arm 103, the user may cause the tape or web to move beneath the magnifying glass 84 at a desired speed for viewing by the particular user. When it is desired to stop the tape, the user simply releases arm 103 and the tape stops instantly due to the fact that the braking wheels 93 and 94 are applied simultaneously with the de-energization of motor 66.

Preferably, the pins or rods 20 and 21 of each reel are removable in order that pins of various lengths may be inserted to accommodate tapes or webs of different widths. Preferably also, the tape guiding frame 75 is constructed as illustrated, in order that rollers of different lengths may be inserted to accommodate tapes or webs of different widths.

While the invention has been described with reference to a particular embodiment, it is not limited thereto, but is susceptible to various modifications.

I claim:

1. Apparatus for enabling easy and rapid visual observation of a marked tape or web, comprising a pair of spaced rotatable reels for supporting the tape, each of said reels including a disk portion, means including an electric motor for driving one of said reels to cause movement of said tape through a reading position, magnifying means at the reading location, a switching and speed controlling device connected to said motor, a pair of brake wheels engageable respectively with the disk portions of said reels for quickly stopping said reels, a manual member for actuating said device, means normally maintaining said member in a position to establish a circuit-opening condition of said device, and means interconnecting said brake wheels with said member to effect engagement of said wheels with said disk portions when said member is in said position and to effect disengagement of said wheels from said disk portions when said member is moved from said position.

2. Apparatus for enabling easy and rapid visual observation of a marked tape or web, comprising a pair of spaced rotatable reels for supporting the tape, each of said reels including a disk portion, means including an electric motor for driving one of said reels to cause movement of said tape through a reading position, magnifying means at the reading location, a resistor connected to said motor, a contact movable into and out of engagement with said resistor and also movable along the resistor to control the energization and speed of operation of said motor, a pair of brake wheels engageable respectively with the disk portions of said reels for quickly stopping said reels, a manual member for actuating said contact, means normally maintaining said member in a position to disconnect said contact from said resistor, and means interconnecting said brake wheels with said member to effect engagement of said wheels with said disk portions when said member is in said position and to effect disengagement of said wheels from said disk portions when said member is moved from said position.

3. Apparatus for enabling easy and rapid visual observation of a marked tape or web, comprising a supporting base, a pair of spaced vertical supporting standards mounted on said base, a pair of rotatable reels supported respectively by said standards and adapted to support said tape, means including an electric motor for driving one of said reels to cause movement of said tape, a horizontal support member extending between said standards above said base, a tape supporting and guiding mechanism adjustably supported by said member, a magnifying device adjustably supported on said mechanism, a switching and speed controlling device mounted on said base and connected to said motor, a manual level on said last-recited device for actuating the same, spring means normally maintaining said lever in a position to establish a circuit opening condition of said last-recited device, brake means for quickly stopping said reels, and means interconnecting said brake means with said lever to render the brake means effective when said lever is in said position and to render the brake means ineffective when said lever is moved from said position.

4. Apparatus for enabling easy and rapid visual observation of a marked tape or web, comprising a supporting base, a pair of spaced vertical supporting standards mounted on said base, a pair of rotatable reels supported respectively by said standards and adapted to support said tape, means including an electric motor for driving one of said reels to cause movement of said tape, a horizontal support member extending between said standards above said base, a tape supporting and guiding mechanism adjustably supported by said member, a magnifying device adjustably supported on said mechanism, a switching and speed controlling device mounted on said base and connected to said motor, said last-recited device including a resistor and a contact movable into and out of engagement with said resistor and also movable along the resistor, a manual lever on said last-recited device for actuating said contact, spring means normally maintaining said lever in a position to establish a circuit opening condition of said last-recited device, brake means for quickly stopping said reels, and means interconnecting said brake means with said lever to render the brake means effective when said lever is in said position and to render the brake means ineffective when said lever is moved from said position.

5. Apparatus for enabling easy and rapid visual observation of a marked tape or web, comprising a supporting base, a pair of spaced vertical supporting standards mounted on said base, a pair of rotatable reels supported respectively by said standards and adapted to support said tape, each of said reels including a disk portion, means including an electric motor for driving one of said reels to cause movement of said tape, a horizontal support member extending between said standards above said base, a tape supporting and guiding mechanism adjustably supported by said member, a magnifying device adjustably supported on said mechanism, a switching and speed controlling device mounted on said base and connected to said motor, a manual lever on said last-recited device for actuating the same, spring means normally maintaining said lever in a position to establish a circuit opening condition of said last-recited device, a shaft extending between said standards and rotatably carried thereby, a pair of arms on said shaft carrying brake wheels engageable respectively with the disk portions of said reels for quickly stopping said reels, and means interconnecting said shaft with said lever to effect engagement of said wheels with said disk portions when said lever is in said position and to effect disengagement of said wheels from said disk portions when said lever is moved from said position.

6. Apparatus for enabling easy and rapid visual observation of a marked tape or web, comprising a supporting base, a pair of spaced vertical supporting standards mounted on said base, a pair of rotatable reels supported respectively by said standards and adapted to support said tape, each of said reels including a disk portion, means including an electric motor for driving one of said reels to cause movement of said tape, a horizontal support member extending between said standards above said base, a tape supporting and guiding mechanism adjustably supported by said member, a magnifying device adjustably supported on said mechanism, a switching and speed controlling device mounted on said base and connected to said motor, said last-recited device including a resistor and a contact movable into and out of engagement with said resistor and also movable along the resistor, a manual lever on said last-recited device for actuating said contact, spring means normally maintaining said lever in a position to establish a circuit opening condition of said last-recited device, a shaft extending between said standards and rotatably carried thereby, a pair of arms on said shaft carrying brake wheels engageable respectively with the disk portions of said reels for quickly stopping said reels, and means interconnecting said shaft with said lever to effect engagement of said wheels with said disk portions when said lever is in said position and to effect disengagement of said wheels from said disk portions when said lever is moved from said position.

ERNEST CONGDON.

References Cited in the file of this patent

UNITED STATES PATENTS

| Number | Name | Date |
|---|---|---|
| 778,347 | Anderson | Dec. 27, 1904 |
| 921,181 | Tanner | May 11, 1909 |
| 1,097,358 | Peck | May 19, 1914 |
| 1,310,689 | Carpenter | July 22, 1919 |
| 1,821,844 | McGrath | Sept. 1, 1931 |
| 2,116,507 | Colin | May 10, 1938 |
| 2,177,638 | Draeger | Oct. 31, 1939 |
| 2,398,226 | Holland | Apr. 9, 1946 |